United States Patent [19]

Tochtrop

[11] 4,188,744
[45] Feb. 19, 1980

[54] MULTIPLE HOOK APPARATUS FOR CAKE FISH-BAIT

[76] Inventor: Charles Tochtrop, Rte. 2, Sunrise Trailer Ct., Warrenton, Mo. 63383

[21] Appl. No.: 955,451

[22] Filed: Oct. 27, 1978

[51] Int. Cl.² ............................................. A01K 83/06
[52] U.S. Cl. .................................................. 43/44.82
[58] Field of Search ................... 43/43.16, 44.2, 44.8, 43/44.82

[56] References Cited

U.S. PATENT DOCUMENTS 3,600,838   8/1971   Bablick ................................. 43/44.8

FOREIGN PATENT DOCUMENTS 1011553   7/1977   Canada ................................... 43/44.82

Primary Examiner—James G. Smith

[57] ABSTRACT

Multiple hook apparatus provides zones on the sides of a cake of fishbait effective to catch fish of the type which nibble on such bait. Three or more barbed fishing hooks of the type having their eyes in a plane substantially perpendicular to their curved hook portions are fastened together by soldering or electric resistance welding, with their eyes in stacked alignment on a common axis and their shanks projecting radially and spaced angularly. Two of these fish-hook assemblies are secured on the parallel opposite sides of a cake of solid fish-bait by fishing line or an eyebolt passing through a bore in the cake, for attachment to a trotline.

7 Claims, 4 Drawing Figures

MULTIPLE HOOK APPARATUS FOR CAKE FISH-BAIT

BACKGROUND OF THE INVENTION

The present invention relates to fishing, and particularly to fishing with solid cake-type fish-bait, as on trotlines.

In the past, fishermen have employed multiple hooks, such as on fishing lures, which generally include several barbed hook portions on a common shank; the hook portions are spaced angularly about the axis of the common shank. Solid cake-type fish-bait, such as of cottonseed or soy, has been used for fishing with nets and with trotlines having single hooks. On trotlines, use of cake-type bait has not always been successful; fish are able to nibble away the cake without being caught on the single hook.

SUMMARY OF THE INVENTION

The primary object of the present invention is to provide a multiple hook apparatus particularly adapted for use on a trotline with solid cake-type fish-bait.

Briefly summarizing, the present invention is comprised of three or more barbed fishing hooks of the type having their eyes in a plane substantially perpendicular to their curved hook portions. The hooks are fastened together in a fish-hook assembly by securing their eyes in stacked alignment, such as by soldering, brazing, or welding, and with their shanks projecting radially and spaced angularly in a substantially common plane; their curved hook portions each project in the same direction substantially perpendicular to the common plane of the shank portions. Two such fish-hook assemblies are secured extending outwardly on the parallel opposite sides of a cake of solid fish-bait, such as cottonseed cake, by fishing line or an eyebolt through a bore through the cake. The pair of fish-hook assemblies, so secured to a cake of bait, and used on a trotline, provide large zones over the surface of the cake in which fish feeding on the cake may be hooked.

DESCRIPTION OF THE PREFERRED EMBODIMENT

Figure 1:
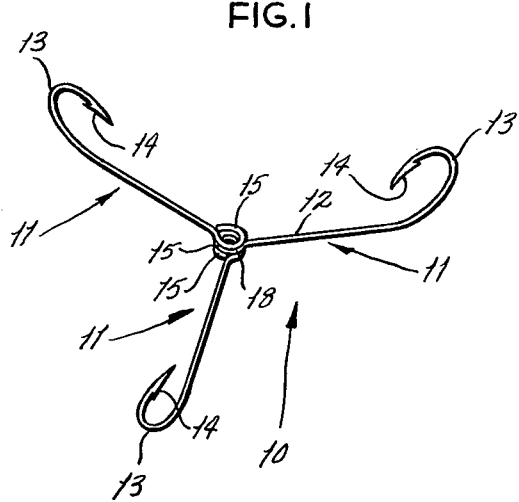
FIG. 1 shows a fish-hook assembly embodying the present invention, utilizing three fishing hooks joined at their eyes by soldering.

In the preferred embodiment of the present invention, a fish-hook assembly, generally designated 10, and shown in FIG. 1, is comprised of three fishing hooks, generally designated 11. The three fishing hooks 11 are identical; each has a substantially straight shank portion 12 which terminates at one of its ends in a planar curved hook portion 13 having a barbed tip 14. The hook portion 13 curves in a plane through substantially 180°, so that its barbed tip 14 extends rearward in the direction of the shank portion 12. At its other end, the shank portion 12 terminates in an eye 15, conventional to fishing hooks, which lie in a plane substantially perpendicular to the plane of the curved hook portion 13.

The three fishing hooks are fastened together at their eyes 15 by a joint 18 which may be formed by soldering, brazing, welding and the like. The eyes 15 are in stacked alignment about a common axis with the shank portions 12 of the fishing hooks 11 projecting radially from the common axis and spaced angularly from each other at substantially 120°. Since the eyes 15 are stacked upon one another, the shank portions 12 are at levels which differ only by the thickness of the material used, and this being relatively small, the shank portions are, for purposes of the claims hereof, said to lie in a substantially common plane. The curved hook portion 13 of each fishing hook 11 projects in the same direction substantially perpendicular to the common plane of the shank portion 12.

Figure 2:
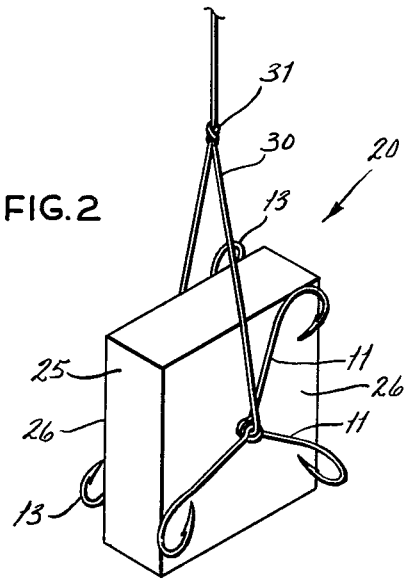
FIG. 2 shows a fish-hook apparatus embodying the present invention, utilizing two fish-hook assemblies as shown in FIG. 1 mounted to a cake of fish-bait by fishing line.

Referring to FIG. 2, in the preferred embodiment a pair of the fish-hook assemblies 10, as shown in FIG. 1, are utilized in a fish-hook apparatus, generally designated 20. The fish hook-apparatus 20 utilizes a square cake of solid cake-type fish-bait 25, such as cottonseed or soy. The cake 25 has two substantially parallel opposite sides 26, the area of each which is substantially equal to the area of the circle bounding the extremeties of the curved hook portions 13 of the fish-hook assemblies 10. Thus, the fishing hooks 11 are longer than one-half the length of the side 26 of the square cake 25, but shorter than one-half the length of a diagonal extending between opposite corners of a parallel side 26 of the cake 25.

Fishing line or string 30, of the type commonly used for trotlines, is used to secure a fish-hook assembly 10 in outwardly-extending position on each of the opposite sides 26 of the fish-bait cake 25. The fishing line 30 passes through a central bore between the opposite parallel sides 26 of the cake 25 and through the fishing hook eyes 15 fastened together by the solder joint 18 and is tied with a slip knot 31 in such manner that the fish-hook apparatus 20 may be hung from a trotline by any conventional method, with the opposite parallel sides 26 of the cake 25 vertical, as shown in FIG. 2.

Figure 3:
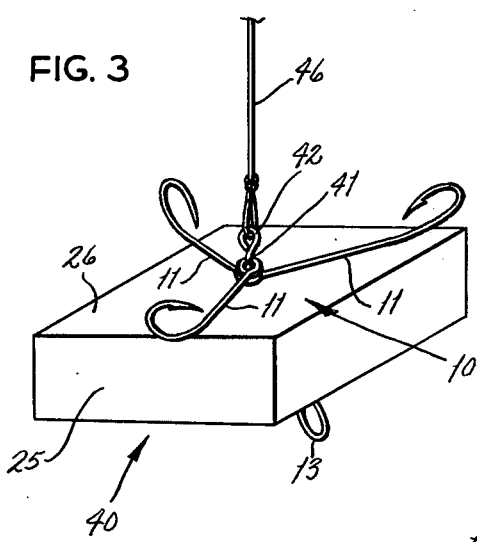
FIG. 3 is an upper side oblique view of a fish-hook apparatus utilizing a pair of fish-hook assemblies as shown in FIG. 1, secured to a cake of fish-bait by an eyebolt.
Figure 4:
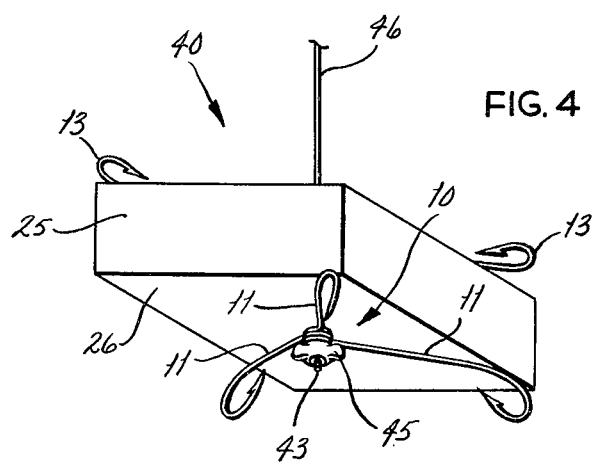
FIG. 4 is a lower side oblique view of the embodiment of FIG. 3.

In an alternate embodiment of the present invention, shown in FIGS. 3 and 4, again a pair of fish-hook assemblies are mounted to a cake of fish-bait 25 to provide a fish-hook apparatus 40. In this embodiment, the parallel opposite sides 26 of the cake 25 are horizontal; an eyebolt 41 extends through the fishing hook eyes 15 joined at the solder joint 18 and through a vertical bore in the cake 25. The eyebolt 41 has an eye head 42 on its upper side, as shown in FIG. 3; a wing nut 45 is fitted on the lower threaded end 43 of the eyebolt 41, as shown in FIG. 4, whereby the pair of fish-hook assemblies 10 are secured to the cake 25. A conventional fishing line 46 used for trotlines is tied through the eye head 42 for attachment of the trotline. Use of a relatively small eyebolt 41 is preferred, so as to pass through the fishing hook eyes 15 and to be less noticeable to and of lesser interference with fish which feed on the bait cake 25.

Manufacture of the fish-hook assembly 10 may be accomplished in several ways. For production of a relatively small number of units, the fishing hooks may be soldered together by mounting their eyes 15 on an aluminum jig to secure them in stacked alignment with the hook shank portions 12 angularly spaced from each other as desired. The fishing hooks 11 may also be assembled into fish-hook assemblies 10 by other processes, in addition to soldering, by which molten metal is added, such as brazing or torch welding, as well as by electric resistance welding, or other means by which the fishing hooks 11 may be fastened together with their eyes 15 in stacked alignment about a common axis, with their shank portions 12 projecting radially from the common axis in a substantially common plane, and with their curved hook portions 13 each projecting in the same direction substantially perpendicular to such common plane.

In use, the fish-hook apparatus 20, 40 as shown in FIG. 2 or 3 and 4 is attached by the fishing line 30, 46 to a trotline, which is a fishing line or string fastened at its opposite ends to objects, such as trees, on opposite sides of a body of water. After attachment to the trotline, the fish-hook apparatus 20, 40 is suspended in the water or lays on the bottom. The fish-hook apparatus 20, 40 may likewise be suspended from a tree limb; it is then known as a limb line. In use in the midwestern United States, the fish-hook apparatus has been found to be most advantageous for catching rough fish, such as catfish, carp, and buffalo, which feed by nibbling rather than by striking.

A principal advantage of the present invention is seen to be in that the pair of fish-hook assemblies 10 secured on the parallel opposite sides 26 of the cake 25 sets up "hooking zones" which may include substantially the entire surface of the opposite sides 26 of the fish-bait cake 25 so that a fish feeding on the cake has a high probability of being hooked. This is thought to be especially true since fish tend to alternately nibble and back away from the cake 25; the fish-hook apparatus then tends to move about and the fish, even if aware of the presence of the fishing hooks 11, may nevertheless become hooked. By the regular angular spacing of the hooks which extend approximately to the edges of the sides 26 of the cake 25, the "hooking zone" is maximized.

By movement of the slip knot 31 in the embodiment of FIG. 2 and the wing nut 45 on the eyebolt 41 in the embodiment of FIGS. 3 and 4, the fish-hook assemblies 10 may be slided nearer to the cake 25 after a portion of the cake 25 has been nibbled away or dissolved. Thus, the apparatus remains effective even after a substantial portion of the bait is gone. The second embodiment lends itself to easy baiting and rebaiting, as the wing nut 45 may be quickly removed to attach a cake 25 to the apparatus.

Modifications will be apparent to persons skilled in the art. For example, the length of the fishing hooks may be varied relative to the dimensions of the fish-bait cake for the best result, for the type and size of fish sought. Other means such as clips may be used to fasten the fishing hooks together and hooks without eyes may be fastened together at the ends of their shanks. Other means to pass through the fish-bait cake and secure the two fish-hook assemblies on its opposite sides may also be used. Still further modifications will, from these examples, suggest themselves.

I claim:

1. For attachment to cake-type fish-bait, a fish-hook assembly comprising three or more fishing hooks, each having a substantially straight shank portion terminating in a planar hook portion curved through substantially 180°, each further having an eye at the opposite end of said shank portion in a plane substantially perpendicular to that of the curved hook portion, and means to fasten said fishing hooks together at their eyes with the said eyes being in stacked alignment about a common axis, their said shank portions projecting radially from said axis spaced angularly from each other in a substantially common plane, and their said curved hook portions each projecting in the same direction substantially perpendicularly from such common plane.

2. The fish-hook assembly as defined in claim 1, wherein said means to fasten said fishing hooks together comprises a joint formed by a process in which molten metal is added.

3. The fish-hook assembly as defined in claim 1, wherein said means to fasten said fishing hooks together comprises a joint formed by electric resistance welding.

4. The fish-hook assembly as defined in claim 1, wherein said fishing hooks are identical and are three in number and their said angular spacing is substantially 120°.

5. Fish-hook apparatus for use with cake-type fish-bait having two substantially parallel opposite sides, comprising a pair of fish-hook assemblies, each having three or more fishing hooks, each having a substantially straight shank portion terminating in a planar hook portion curved through substantially 180°, and having means to fasten said fishing hooks together at the ends of their shank portions opposite said curved hook portion with their shank portions projecting radially in a substantially common plane and spaced angularly from one another, and their said curved hook portions each projecting in the same direction substantially perpendicularly from said common plane, and further comprising means to pass through such cake fish-bait between its substantially opposite sides and to secure said two fish-hook assemblies in outwardly-extending positions from the opposite sides of such fish-bait, whereby to provide zones on such opposite sides of such fish-bait in which a fish feeding on such fish-bait may be hooked.

6. The fish-hook apparatus as defined in claim 5, wherein said means to fasten has a central bore along an axis perpendicular to such common plane, and said means to pass through such fish-bait and secure the two fish-hook assemblies on opposite sides of such fish-bait comprises an eyebolt having a wing nut.

7. The fish-hook apparatus as defined in claim 5, wherein all said fishing hooks are substantially the same length, whereby the extremeties of their curved hook portions lie in the circumference of a circle, and wherein their length is such that the area of said circle is substantially equal to the area of each of such opposite sides of such fish-bait.

* * * * *